March 13, 1962   D. WILLISON ETAL   3,024,919
CARGO CONTAINER HANDLING SYSTEM
Filed July 31, 1959   3 Sheets-Sheet 1

INVENTOR.
DONALD WILLISON
BY DAVID J. WYROUGH
Henry Kozak
ATTORNEY

INVENTORS
DONALD WILLISON
BY DAVID J. WYROUGH
Henry Kozak
ATTORNEY

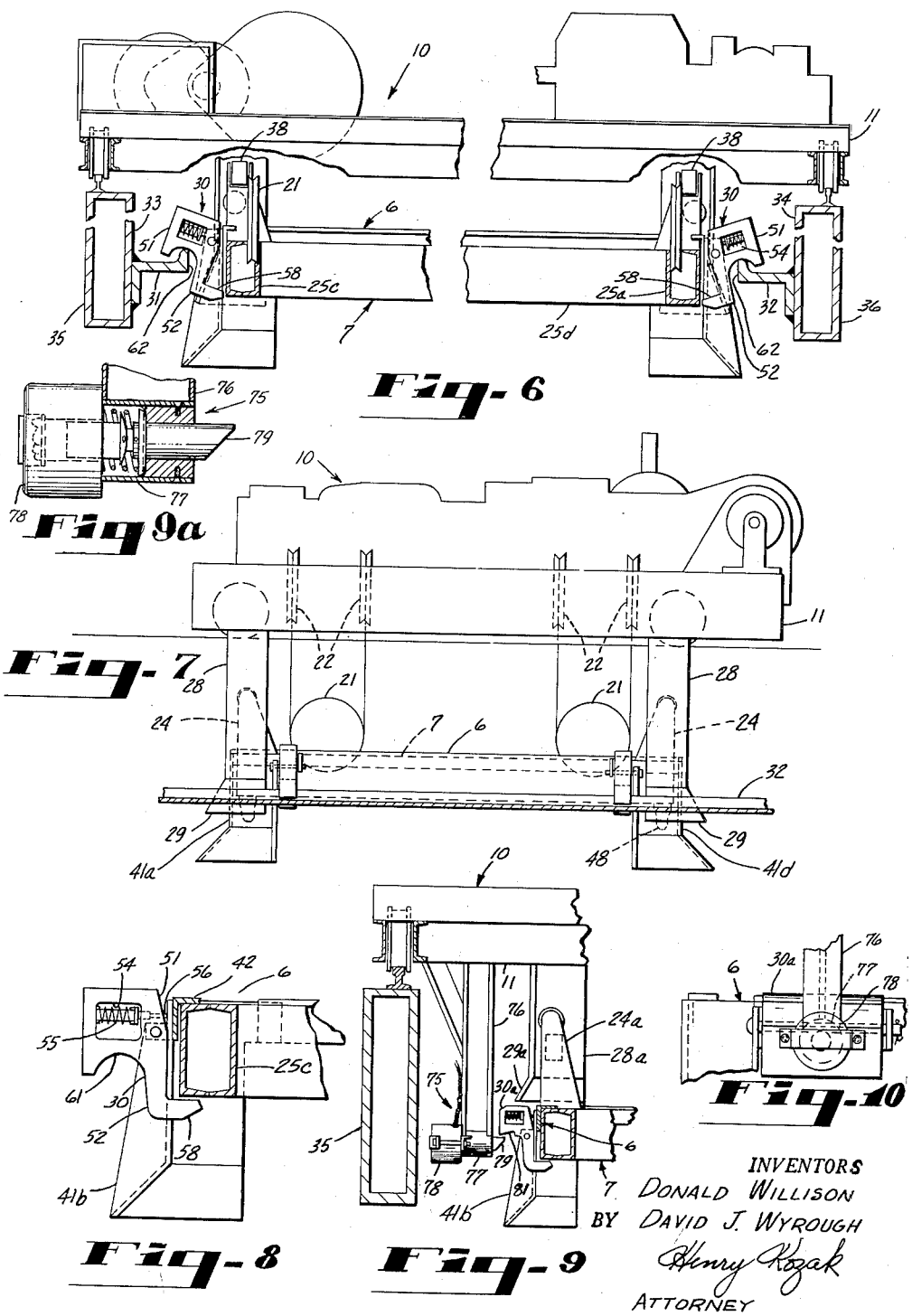

United States Patent Office 3,024,919
Patented Mar. 13, 1962

3,024,919
CARGO CONTAINER HANDLING SYSTEM
Donald Willison, Lyndhurst, and David J. Wyrough, Maple Heights, Ohio, assignors to National Castings Company, a corporation of Ohio
Filed July 31, 1959, Ser. No. 830,785
19 Claims. (Cl. 212—14)

The present invention relates to a system for lifting cargo containers individually and bodily from one carrying or supporting medium to another. Specifically, it relates to a guide rack which may be temporarily carrier on a hoisting implement adapted to couple directly to a cargo container, or other article, to guide the implement in its approach into coupling relation with such article.

There are a number of known systems for handling freight or cargo based upon the use of cargo containers and hoisting equipment for transferring the containers from one carrier or support to another. Such hoisting equipment commonly includes a horizontally flat frame-like implement suspended from a crane on a cable-pulley system and adapted to be connected with the container at a number of points along its top or side portions.

A problem arising in the use of such an implement is that of bringing it quickly into superjacent and vertically aligned relation with the container, enabling rapid automatic or manual coupling of the implement and the container. Positioning of the implement may be facilitated by guides attached to the frame-like implement which extend downwardly and outwardly with respect to the upper periphery of a container in a position for coupling with the implement.

However, a hoisting implement (known to many in the trade as a "spreader") of a type useful in loading and unloading seagoing vessels, particularly a vessel equipped with a vertical guide system for stacking the containers in the hull, must have a horizontal outline or plan contour adapting it for entering the hold of a vessel which is within the top periphery or plan contour of a container conforming to the guide system of the vessel. When the hoisting implement conforms with small clearance to the vertical guide system of the vessel, the guide system itself functions to align a hoisting implement for coupling with containers to be removed from the vessel. Hence, guides on the implement facilitating coupling with its work are unnecessary and even disadvantageous in this instance. However, such guides are highly desirable in attempting to couple the implement with a container supported, for example, on a flat car and must necessarily extend laterally beyond the top periphery of the container. Such guides must be rendered retractable from outboard relation with the implement in order that it may pass without interference through hatch openings, between closely spaced stacks of containers, or within vessels constructed to carry the containers in closely spaced stacks.

Hence, the primary object of the present invention is to provide a system for lifting articles of uniform shape and size from carrier to carrier which utilizes guides for properly aligning a lifting implement superjacently over one of such articles but which may be stored in detached relation with the implement on another portion of the system when not in use.

A further object is to provide a system in accordance with the foregoing object wherein the detachment of the guides from the implement and entry into a storage facility, or attachment of the guides to the implement from such storage facility, occur automatically and without auxiliary control mechanism or special manipulation by an operator.

Another object is to provide guiding equipment suitable for use on cargo container handling equipment which does not require lateral clearance in being transferred to an inoperative position additional to that required in its guiding function.

It is also an object to provide a cargo container handling system in accordance with the foregoing objects adaptable in principle to all types of hoisting equipment comprising a lifting implement carried by a horizontally traveling overhead crane.

A further object is to equip a hoisting implement with guiding facilities at a minimum of cost.

Briefly stated, the invention consists of a cargo handling system comprising an implement for coupling with, and hoisting, an article having laterally-facing surfaces; a crane for raising and lowering the implement; a guide rack comprising a frame adapted to rest on the implement, and guides extending downwardly from the rack and when the frame rests on the implement, extending below the implement for engaging the laterally-facing surfaces of the article to place the implement in a desired vertical alignment for coupling with said article.

In a typical embodiment the system includes a structure for supporting the crane, such as an elevated track defining a horizontal ambit along which the implement is portable, when raised to a position in subjacent relation to the chassis, through a horizontal path parallel to the ambit; the system further including a fixed support, such as rails, extending in parallel adjacent relation with each of opposite sides of said path; and extension elements on the rack extending laterally from its frame which, at said subjacent position of the rack, extend into overhanging relation with the support, e.g., the rails. Such rails are mutually coextensive in the direction of said ambit and non-coextensive with the ambit by a continuous distance equal to or greater than the dimension of the rack parallel to the ambit.

The vertically overlapping structure of the rack and the implement, especially the guides of the rack which extend vertically through or beside portions of the implement, is horizontally non-overlapping to permit descent of the implement away from the rack without interference when the rack is resting on the support or rails. The rails for receiving the rack are shorter than the ambit in order that the crane may carry the implement with the rack supported thereon to a position wherein the implement and the rack may be lowered without engagement of the rack with the supporting rails therefor.

In the accompanying drawing with respect to which the invention is described:

FIG. 6 is a fragmentary vertically and longitudinally shortened elevation in section of the rack and the implement of previous figures, the supporting crane therefor, and fixed structure for supporting the crane and the rack when separated from the implement.

FIG. 7 is a schematic end elevation of the apparatus shown in FIG. 6.

FIG. 8 is a fragmentary elevation in section illustrating the guide rack as supported on the hoisting implement of the crane.

FIG. 9 is a fragmentary elevation in section illustrating a crane chassis, hoisting implement, and guide rack, all of modified design. FIG. 9 is comparable with FIG. 6 of the earlier illustrated embodiment.

FIG. 9a is an enlarged fragmentary elevation partly in longitudinal section, illustrating the solenoid plunger assembly of FIG. 9.

FIG. 10 is a fragmentary elevation of a portion of the guide rack and a solenoid-actuated support therefor, shown in FIG. 9.

Figure 1:
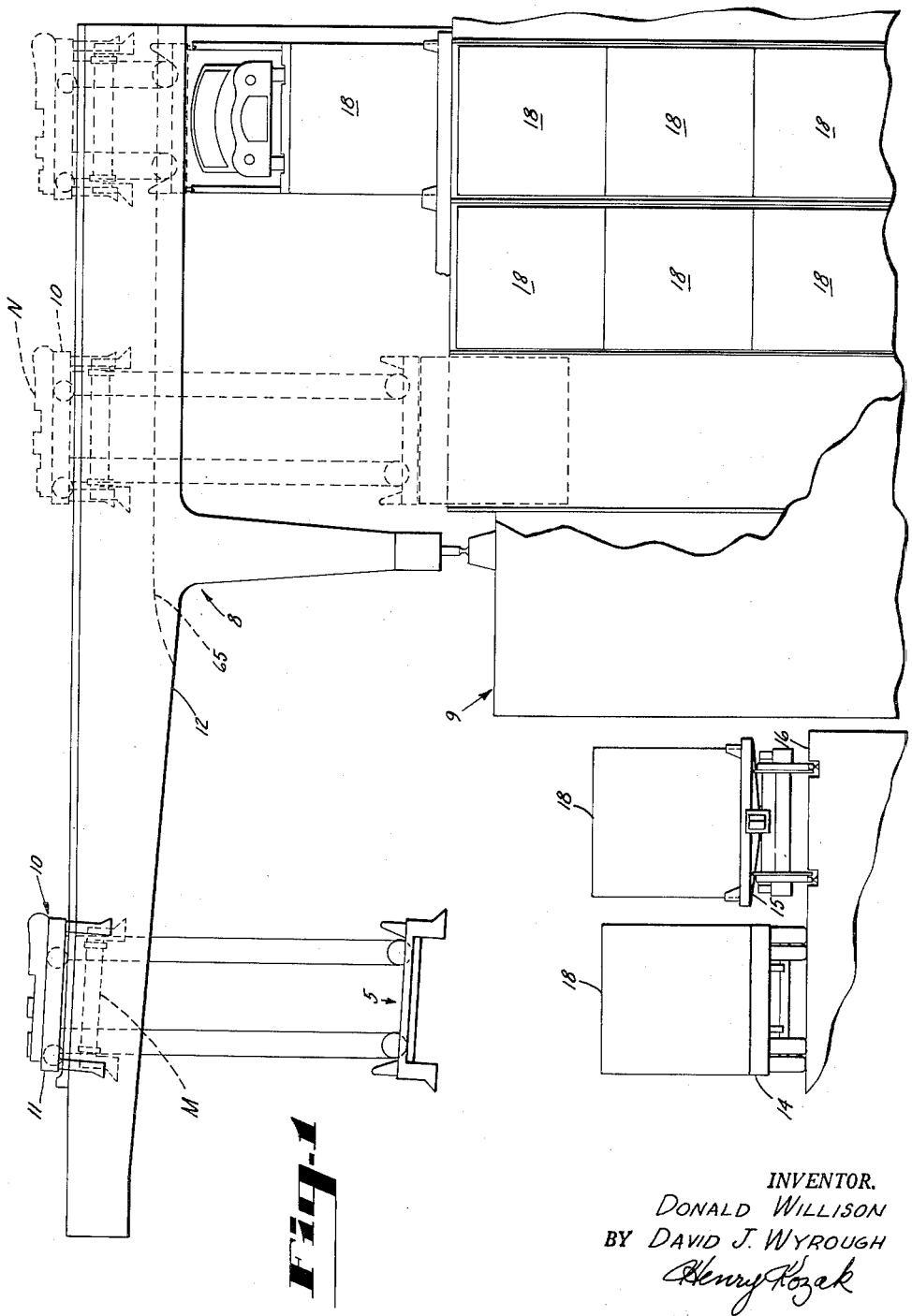
FIG. 1 is a schematic elevation of a cargo vessel supporting a gantry crane which in turn supports a hoisting implement for access to the dockside vehicles and the interior of the vessel, as shown.

With attention now to the drawing, FIGS. 2, 3, 4, and 5 illustrate a hoisting device 5 comprising a guide rack 6, and a hoisting implement 7. The device 5 is useful, for example, as a portion of the gantry crane 8 shown in FIG. 1 mounted on the deck of a cargo vessel 9. The device 5 is suspended from an overhead crane 10 by a conventional cable and pulley system shown schematically in FIG. 1 extending from the chassis 11 of the crane. The crane 10 is mobile in the usual manner along spaced runways of the cantilever gantry frame 12 through an ambit carrying it overhead of flat bed vehicles 14 and 15 on the dock 16, and transversely overhead the cargo receiving hatchways of the vessel 9. Though not shown, the gantry frame 12 may include a cantilever section overhanging the right side of the vessel, similar to that shown at the left.

The present invention is concerned primarily with the problem of storing guides used in combination with the hoisting implement, e.g., spreader 7, to facilitate coupling with containers of uniform top peripheries. Such storing is desired during operation of the implement in which association of the guides with the implement is not desired. For example, any guides assisting in the pick-up of the container 18 resting on the vehicles 14 and 15 for transferral to the interior of the vessel must be withdrawn from lateral outboard relation with the implement 7 for entry of the implement into the hatch openings of the vessel. The guide rack 6 provides an integrated assembly of guides which, when used in conjunction with the implement 7, serves this purpose.

The hoisting implement or "spreader" 7 comprises a framework 20 of horizontally flat, rectangular construction, in its normal operating position. It is constituted, along its periphery, of box girders 25a, b, c, d meeting at four corners of the framework. The implement 7 is suspended from the crane 10, and raised and lowered, by cables 19 laced around pulleys 21 rotatably secured to the framework 20 in vertical alignment with cooperating pulleys 22 rotatably mounted in the chassis of the crane 10.

The implement 7 has guide portions 24 which extend upwardly from the four corners of the framework 20. These four guide portions cooperate with four aligning legs 28 which are fixed to the underside of the chassis 11, extend generally vertically downwardly, and terminate in outwardly flared aprons 29. The legs 28 are of horizontally right-angle cross-section with the interior right-angle faces thereof facing interiorly of a region for receiving the implement 7. The legs 28 are disposed at the corners of this region with the additional clearance needed to receive the device 5, i.e., the implement 7 with the guide rack 6 supported thereon. The cooperation of the guide portions 24 with the legs 28 facilitate horizontal positioning of the device 5, when moving upwardly into a position just beyond a pair of Z rails 31 and 32 at an elevation placing extension elements 30 of the guide rack 6 above these rails. The device 5 can then be moved horizontally to place the elements 40 in overhanging relation with the rails 31 and 32. These rails are attached to mutually-facing lateral faces 33 and 34 of elevated runways 35 and 36, respectively, of the gantry crane 12.

To facilitate the initial entry of the device 5 upwardly into the region bounded by the aligning legs 28 of the crane, the guide portions 24 of the implement 7 are provided with rollers 38 and 39 pivotally mounted in each guide portion with peripheral surfaces protruding through each of the two outer walls of each guide portion. The rollers are thus arranged for rolling contact with the inner surfaces of the legs 28 as guide portions 24 are moved upwardly therealong.

Figure 2:
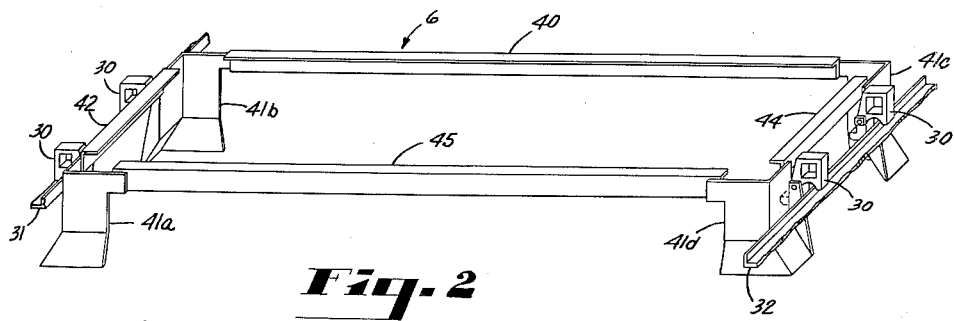
FIG. 2 is an oblique view of a guide rack embodied in the invention.

Observing FIG. 2, the guide rack 6 comprises a horizontally rectangular frame 40 and four guides 41a, b, c, d, extending downwardly from the four corners of the frame. In the embodiment shown, the frame 40 further comprises horizontally elongate angle pieces 42, 43, 44, and 45. The angle pieces are arranged with their interior angles defining the upper extremity of a region for receiving the framework 20 of the hoisting implement 7. That is to say, the downward-facing surfaces of the horizontal flanges of the angle pieces are arranged to engage the upward-facing surfaces of the box girders 25 of the implement 7. The exterior surfaces of the girders 25 fit within the inward-facing surfaces of the vertical flanges of the angle pieces so as to obtain substantial overlapping of the horizontal flanges of the angle pieces with the top surface of the framework 20 whenever the guide rack 6 rests upon the implement 7.

Figure 3:
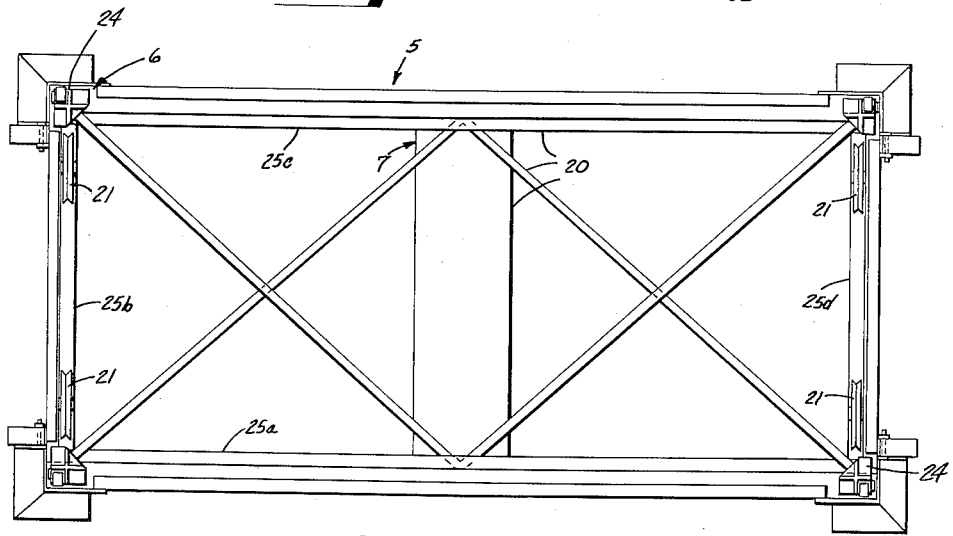
FIG. 3 is a plan view of the guide rack of FIG. 2 resting on a hoisting implement in a typically operative position.
Figure 4:
FIG. 4 is a side elevation of the rack and implement of FIG. 3.

When the rack 6 rests upon the implement 7, as shown in FIGS. 2 and 3, the guides 41a to 41d extend substantially below the framework 20 of the implement 7 into vertically overlapping relation with the sides of a container 18 coupled to the implement. The implement 7 is shown in FIG. 4 connected with the container by connectors 48 extending into interlocking relation with the container within cavities 49 thereof. The specific construction of means for connecting the implement 7 and the container 18 is not a part of this invention.

The elements 30 are generally Z-shaped, each having an upper arm 51 and a lower arm 52. Referring to FIG. 8, the upper outer arm has a cavity 54 which houses a spring 55 and a plunger 56 urged toward the adjacent angle piece 42 or 44 through an aperture in the cavity wall. As viewed in FIG. 8, the plunger urges the element 30 in a counterclockwise direction tending to position the toe 58 underneath an undersurface of the adjacent box girder 25c.

When the guide rack 6 rests on the implement 7 for use in picking up containers, the elements 30 are positioned as shown in FIG. 8. The toes 58 of the various elements 30 are positioned under the implement frame to prevent dislodgment of the guide rack from its operative position in the event the device 5 is lowered in a careless manner, tending to lift the rack free of the implement as, for example, when one or more of its guides 41a, b, c, d are brought into contact with the upper surface of the container.

To separate the guide rack from the implement, the device 5 is carried into superposition with the tracks or Z bars 31 and 32 and then lowered with respect thereto to bring the arcuate undersurfaces 61 of elements 30 into engagement with the upturned flange 62 of the Z bar 31. As the implement 7 is lowered, the weight of the rack causes a rotative force to be applied to the elements which displaces the toes thereof from underneath the framework 20 of the implement, as shown in FIG. 6. At this point the implement 7 may continue downwardly free of the rack 6 and pass, for example, into a container storage cell of a vessel, such as illustrated in FIG. 1. When the crane 10 is engaged in a container lifting operation requiring the support of the rack 6 on the rails 31 and 32, the crane is preferably not shifted along its runways 35 and 36 in order to avoid disturbing the vertical alignment of the implement 7 with the rack 6. This is to facilitate re-entry of the implement into the guides of the rack and resumption of the piggy-back relation of the rack with the implement useful in the unloading of flat cars.

Figure 5:
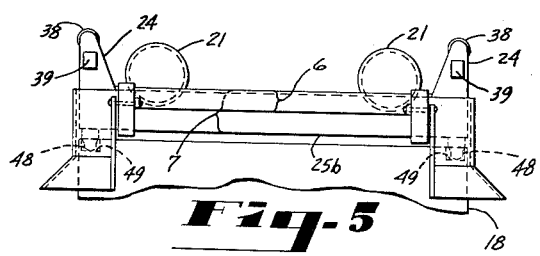
FIG. 5 is an end elevation of the rack and implement of FIGS. 3 and 4.

To accompany the apparatus of FIGS. 1 to 8 through a cycle of loading and unloading, with attention particularly to FIG. 5, the device 5 comprising the guide rack 6 and the spreader or implement 7 is shown in a position over the vehicle 14 carrying a container 18. The device may be further lowered and coupled with the container 18 then raised in a vertical path to the position M (illustrated in ghost outline). At this position, the elements 30 are higher than the Z bars 31 and 32 although not positioned thereover. Thereafter the crane 10 is moved lengthwise of the runways 35 and 36 to place the crane with the device 5 inboardly and overhead of the hatch openings of the vessel. In making the horizontal movement from position M to position N, the device 5 has passed inwardly over the outboard end of the support on the gantry frame for the guide rack, i.e., Z bars 31 and 32 indicated in FIG. 5 by line 65.

The cable storage mechanism of the crane is operated to lower the device until the elements 30 of the rack engage the tracks 31, 32. At this instant the implement 7 is released from the rack 6, as hereinbefore explained, and the implement with the container attached thereto passes downwardly into the vessel to its storage position. After releasing the implement from the container, the implement is raised again along the vertical path of descent until its framework engages the frame of the rack 6. The implement continues upwardly to lift the rack off the tracks 31, 32. The crane, along with the device 5, is then in a condition adapting it for moving horizontally upwardly to a position beyond the end of the tracks 31, 32 in a position, for example, for removing the container 18 from the vehicle 15.

FIGS. 9 and 10 illustrate an additional embodiment of the invention wherein support for the guide rack, when free of the implement or spreader 7, is derived from the chassis 11 of the crane 10. In the previously described embodiment, such support was made directly from the runways 35 and 36 of the gantry frame.

The embodiment of FIGS. 9 and 10 is distinguished primarily by a plurality of supports 75 carried by the chassis 11 which correspond in number to the number of extension elements 30 carried on the guide rack 6. Each support 75 comprises a post 76 attached fixedly at its upper end to the chassis 11 and terminates in a horizontally bored bearing 77 at its lower end. Clamped to the outboard side of the bearing 77 at one extremity of the bore thereof is a solenoid 78 operatively connected with a plunger 79 positioned in the bearing 77 for movement lengthwise of its bore. The support further comprises a conventional spring arrangement as shown in FIG. 9a for urging the plunger into the position shown wherein it will be engaged by the element 30a in vertical alignment therewith and cammed inwardly of the bearing as the element and associated guide rack are lifted upwardly past the plunger.

As shown, the guide rack 6 rests on the implement 7 and the assembly of these two units occupies a position placing an undersurface 81 of the element 30a closely superjacent the upper surface of the plunger 79. It is understood, of course, that other similar elements 30a and plungers 79 of the system are simultaneously and similarly positioned.

The embodiment of FIGS. 9 and 10 is further distinguished by a plurality of aligning legs 28a which depend from the underside of the chassis 11, and a corresponding plurality of guide portions 24a which project upwardly from the four corners of the framework 20 of the implement 7. The legs 28a are shortened with respect to the legs 28 of the earlier embodiment so that the aprons 29a thereof are disposed above the implement and guide rack at the position illustrated by FIG. 9. The guide portions 24a are upwardly lengthened as compared with their counterparts, i.e., guide portions 24 in FIG. 7. This assures rolling contact of the implement 7 with the legs as the implement with the guide rack resting thereon is raised into position for seating on the solenoid plungers 79. The elements 30a are of substantial horizontal length, e.g., 8 inches, to assure vertical alignment with the plungers 79 under operating conditions.

When the implement 7 and the guide rack 6 are lowered, the elements 30a engage the solenoid plungers along respective undersurfaces 81 in the same manner as elements 30 of the earlier described embodiment engage rails 31 and 32. Thereafter the implement 7 moves downwardly free of the guide rack with the latter being supported by the plurality of post (76)-solenoid (78)-plunger (79) assemblies just described. The implement may then be lowered, e.g., into the hold of a ship with the guide rack supported just underneath the crane chassis.

When the implement 7 is again raised into adjacent relation with the plungers 79, the solenoids may be energized to retract the plungers to release the guide rack into position on the frame. If desired, the elevation of the implement 7 for receiving the guide rack upon its release from the crane may be left to the discretion of the crane operator. For example, the plungers 79 may be retracted after the implement 7 has raised the guide rack off the plungers, or the plungers may be retracted to let the guide rack drop a half inch or so onto its seat on the implement.

The terms and expressions which have been employed are used as terms of description and not of limitation and there is no intention of excluding any equivalents of the invention described or of the portions thereof as fall within the purview of the claims.

What is claimed is:

1. A device for a cargo handling crane comprising: a hoisting implement having means for coupling with a cargo container; a guide rack interrelated with the implement to rest in a predetermined position on the implement; the rack comprising guide means extending, at said position, below the implement for engaging a container and guiding the implement into coupling position thereover; said rack and implement being relatively arranged, at said position, with vertically overlapping portions thereof in horizontally offset relationship for the separation of the implement from the rack in a direction downward from the rack.

2. The device of claim 1 wherein: the guide means extends, at said position, downwardly in close outside relation with the outer lateral periphery of the implement for guide relationship between the implement and the rack during relative movements of one with the other.

3. In a cargo handling crane: a hoisting implement having means for coupling to the top of a cargo container; a guide rack interrelated with the implement to rest in a predetermined position upon the implement; the rack comprising guide means extending, at said position, below the implement for engaging a container and guiding the implement into coupling position thereover; means for supporting the rack independently of the implement; said rack and implement being structurally arranged for separation of the implement from the rack in a direction downwardly from the rack; and extension means on the rack engageable with said supporting means to permit lowering of the implement away from the rack.

4. The cargo handling crane of claim 3 wherein: the guide means extends, at said position, downwardly in close outside relation with the outer lateral periphery of the implement for guide relationship between the implement and the rack during relative movements of one with the other.

5. The cargo handling crane of claim 3 wherein: said extension means comprises elements pivotably supported by the rack and rotatable into and out of subjacent relation with downward facing surfaces of the implement; said elements being normally in said subjacent relationship at said position of the rack and rotatable out of said relationship as the rack comes to rest on said supporting means.

6. The cargo handling crane of claim 3 wherein: the implement comprises a horizontally flat framework and the rack comprises a frame conforming generally to the top periphery of the framework; the frame having laterally inward facing surfaces, and downward facing surfaces disposed above, and extending laterally inwardly from, the inward facing surfaces; said surfaces being arranged to engage and overlap upper corner surfaces of the framework generally along its top perimeter.

7. In a cargo handling system: an implement for coupling with, and hoisting, an article having laterally-facing surfaces; a crane supporting the implement comprising a chassis, and elevating means for raising and lowering the implement with respect to the chassis; a guide rack comprising a frame adapted to rest on an upwardly-facing surface of the implement, and guiding means extending downwardly from the frame and, when the frame rests on the implement, extending below the implement in a horizontal pattern adapting the guiding means for engaging said laterally-facing surfaces in guide relationship whereby the implement is guided into a desired vertical alignment for coupling with said article; means for supporting the crane along a horizontal ambit; said implement, when raised to a position in subjacent relation to said chassis, being portable by the crane along a horizontal path parallel to said ambit; a pair of fixed supports extending in parallel adjacent relation with said path along opposite sides thereof; said supports being generally coextensive with each other but shorter than the ambit by a continuous distance equal to or greater than the dimension of the rack parallel to the ambit forming thereby a vertical pathway for the rack to a region below the supports; extension elements extending laterally from said frame and extending, at said subjacent position of the rack, into overhanging relation with said supports; the implement being open in an upward direction with respect to said frame and the guiding means of the rack, when the rack is seated thereon, to permit descent of the implement away from the rack without interference when the rack is resting on said supports.

8. In a system for handling cargo containers: an implement for coupling with, and hoisting, a container of predetermined top periphery; a crane supporting the implement comprising a chassis, an elevating means for raising and lowering the implement with respect to the chassis; a guide rack comprising a frame adapted to rest on an upwardly-facing surface of the implement, and a plurality of guide members spaced along a horizontal circuit complementary to said periphery and extending downwardly from the frame; said members extending, when the frame rests on the implement, below the implement for engaging laterally outward facing surfaces of the container along said periphery; means for supporting the crane along a horizontal ambit; said implement, when raised to a position in subjacent relation to said chassis, being portable by the crane along a horizontal path parallel to said ambit; a pair of supports fixed with respect to said means for supporting the crane extending in parallel adjacent relation with said path along opposite sides thereof; said supports being generally coextensive with each other but shorter than the ambit by a continuous distance equal to or greater than the dimension of the rack parallel to the ambit forming thereby a vertical pathway for the rack to a region below the supports; the rack having extension elements extending laterally from said frame and extending, at said subjacent position of the rack, into overhanging relation with said supports; the implement being vertically open in an upward direction with respect to said frame and the guiding means of the rack, when the rack is seated thereon, to permit descent of the implement away from the rack without interference following the positioning of the rack on said supports.

9. The system of claim 8 comprising: latch means for limiting relative vertical movement between the implement and the rack upwardly from its seat on the implement, said latch means being movably mounted on the rack for movement into and out of a position for interlocking relation with the implement; said extension elements being movably mounted on the rack and operatively connected with the latching means; said elements being movably responsive to the weight of the rack on said supports as transmitted through the elements to withdraw the latching means from interlocking relation with the implement; means acting on the elements and the latch means urging the latch means into said position.

10. A system according to claim 8 wherein: each element comprises an outer arm and an inner arm, and is pivotably supported by the frame with respect to a horizontal axis extending through the element between said arms and adjacent to the side of the frame from which the element extends; said outer arm providing said overhanging relation of the element relative to one of said supports; said inner arm forming a latch extending horizontally into subjacent relation with a downward facing surface of the rack when the rack is seated on the implement and clear of the support which said element may overhang; said element being rotatable in one direction through an angle withdrawing said inner arm from horizontally overlapping relation with said downward facing surface; and means urging the element in the direction of rotation opposite to said one direction.

11. The system of claim 10 wherein: each element is Z-shaped and said inner arm is L-shaped in laterally inturned relation with the frame; and said outer arm houses a plunger projecting laterally inwardly toward the frame, and spring means urging the plunger toward the frame at an elevation above the axis of said element.

12. The system of claim 8 wherein: the implement comprises a generally horizontally flat framework; said frame has downward facing surfaces arranged to engage perimetric marginal upward facing surfaces of the framework, and laterally facing surfaces adjacent said downward facing surfaces extending downwardly therefrom for close opposing relation with laterally facing perimetric surfaces of the framework.

13. The system of claim 8 wherein: the means for supporting the crane comprises a pair of parallel elevated runways spaced to receive the crane therebetween, and each of said supports is supported in the space between the runways in attached closely spaced relation with the inner lateral face of one of the runways.

14. In a system for handling cargo containers: an implement for coupling with, and hoisting, a container having a generally rectangular top periphery of predetermined size; said implement having an overall horizontal periphery approximately dimensionally within said top periphery; a crane supporting the implement comprising a chassis, and elevating means for raising and lowering the implement with respect to the chassis; a guide rack comprising a horizontally rectangular frame adapted to rest on a perimetric upwardly facing rectangular surface of the implement; a guiding means extending downwardly from each corner of the frame adapted to fit around a corner of the container, each guiding means having a vertical section terminating in an apron extending downwardly and outwardly with respect to the region in which a container is received within said guiding means; said implement, when raised to a position in subjacent relation to said chassis, being portable by the crane along a horizontal path parallel to said ambit; a pair of fixed supports extending in parallel adjacent relation to said path along opposite sides thereof; said supports being generally coextensive with each other but shorter than the ambit by a continuous distance equal to or greater than the dimension of the rack parallel to the ambit forming thereby a vertical pathway for the rack to a region below the supports; said rack having extension elements extending laterally from the frame and extending, at said subjacent position of the rack, into overhanging relation with said supports; said rack and implement being structurally arranged for the separation of the implement in a direction vertically downward from the rack.

15. In a cargo handling system; a hoisting implement having means for coupling with a cargo article to be lifted; a guide rack interrelated with the implement to rest in a predetermined position upon the implement; the rack comprising guide means extending, at said position, below the implement for engaging a cargo article and guiding the implement into a position thereover for coupling; a crane comprising a chassis, and elevating means for raising and lowering the implement with respect to the chassis; releasable means mounted on said chassis for supporting the rack independently of the implement; and extension means on the rack engageable with said supporting means to permit lowering of the implement away from the rack.

16. The cargo handling system of claim 15 wherein: said releasable means comprises a horizontally movable detent projecting at its normal position into a path traversed by said extension means in movement of the guide rack and the implement relative to the chassis; and means for retracting the detent from said path.

17. The cargo handling system of claim 15 wherein: the extension means comprises an element having an upper outturned arm adapted for engaging the supporting means, a lower inturned arm adapted for engaging an undersurface of the implement, and spring means acting between the element and a portion of the guide rack urging said lower arm into latching relation with said undersurface; and said releasable means comprises a bearing fixed to the chassis, a plunger horizontally movable within the bearing and extending into a path traversed by said element in vertical movement of the guide rack and the implement relative to the chassis, solenoid means operatively connected with the plunger for retraction thereof from said path; and spring means urging the plunger into said path.

18. In a cargo handling system: a hoisting implement having means for coupling a cargo article to be lifted; a guide rack interrelated with the implement to rest in a predetermined position upon the implement, the rack comprising guide means extending, at said position, below the implement for engaging a cargo article and guiding the implement into a position thereover for coupling; means for supporting the rack independently of the implement; extension means on the rack engageable with said supporting means to permit lowering of the implement away from the rack; guide portions extending upwardly from said implement; aligning legs mounted on said chassis and extending downwardly therefrom into vertically overlapping relation with said guide portions but terminating above the implement and the guide rack at a vertical position of the implement for transferring the guide rack to said supporting means.

19. The cargo handling system of claim 18 wherein the implement and the guide rack are generally rectangular along horizontal planes thereof; each of said guide portions extends upwardly from one of four corners of the implement and comprises rollers protruding laterally outwardly of the periphery of the implement; and each of the aligning legs is of angular horizontal cross-section; the legs having internally facing vertical surfaces defining a rectangular region for receiving the rollers of the guide portions in close clearance with said vertical surfaces; and said legs have lower flared apron portions.

References Cited in the file of this patent
UNITED STATES PATENTS
2,609,954    Sutherland _____ Sept. 9, 1952